(12) United States Patent
Eser et al.

(10) Patent No.: US 10,794,322 B2
(45) Date of Patent: Oct. 6, 2020

(54) METHOD AND DEVICE FOR OPERATING AN INTERNAL COMBUSTION ENGINE

(71) Applicant: CPT Group GmbH, Hannover (DE)

(72) Inventors: Gerhard Eser, Hemau (DE); Hong Zhang, Tegernheim (DE)

(73) Assignee: VITESCO TECHNOLOGIES GMBH, Hanover (DE)

(*) Notice: Subject to any disclaimer, the term of this patent is extended or adjusted under 35 U.S.C. 154(b) by 0 days.

(21) Appl. No.: 16/339,999

(22) PCT Filed: Sep. 18, 2017

(86) PCT No.: PCT/EP2017/073498
§ 371 (c)(1),
(2) Date: Apr. 5, 2019

(87) PCT Pub. No.: WO2018/068995
PCT Pub. Date: Apr. 19, 2018

(65) Prior Publication Data
US 2020/0032737 A1   Jan. 30, 2020

(30) Foreign Application Priority Data
Oct. 10, 2016   (DE) .................. 10 2016 219 575

(51) Int. Cl.
*F02D 41/40*   (2006.01)
*F02D 41/14*   (2006.01)
(Continued)

(52) U.S. Cl.
CPC ....... *F02D 41/401* (2013.01); *F02D 41/0085* (2013.01); *F02D 41/14* (2013.01); *F02D 41/221* (2013.01); *F02D 2250/18* (2013.01)

(58) Field of Classification Search
CPC .... F02D 41/401; F02D 41/14; F02D 41/0085; F02D 41/221; F02D 2250/18
(Continued)

(56) References Cited

U.S. PATENT DOCUMENTS 5,226,390 A * 7/1993 Nakagawa ............ F02D 35/023
123/436
7,178,507 B1   2/2007 Gangopadhyay ............. 123/435
(Continued)

FOREIGN PATENT DOCUMENTS

DE   10 2004 044 808 A1   4/2006
DE      601 17 090 T2    11/2006
(Continued)

OTHER PUBLICATIONS

German Office Action, Application No. 10 2016 219 575.1, 4 pages, dated Apr. 12, 2017.
(Continued)

*Primary Examiner* — Mahmoud Gimie
(74) *Attorney, Agent, or Firm* — Slayden Grubert Beard PLLC

(57) ABSTRACT

Various embodiments include a method for operating an internal combustion engine comprising: determining a torque output of each cylinder resulting from a fuel injection; determining a difference in the respective torque output; comparing the difference with a predetermined threshold; determining a respective injection mass; determining a difference in the respective injection masses; comparing the difference with a threshold; if the differences exceed the threshold, determining whether the respective torque outputs correspond to the associated injection mass; and if the respective torque outputs lie outside a predetermined toler-
(Continued)

ance range for a respective corresponding injection mass, changing an injection time in at least one of the at least two cylinders.

9 Claims, 4 Drawing Sheets

(51) Int. Cl.
F02D 41/22 (2006.01)
F02D 41/00 (2006.01)

(58) Field of Classification Search
USPC .......................................................... 701/104
See application file for complete search history.

(56) References Cited

U.S. PATENT DOCUMENTS

| | | | | |
|---|---|---|---|---|
| 7,480,557 B2 * | 1/2009 | Yamaguchi | ........... | F02D 35/023 123/299 |
| 7,899,603 B2 * | 3/2011 | Yamamoto | .......... | F02D 41/3076 701/104 |
| 7,921,700 B2 | 4/2011 | Raichle et al. | ............. | 73/114.27 |
| 2002/0112528 A1 | 8/2002 | Antonioli et al. | ............. | 73/49.7 |
| 2008/0276904 A1 * | 11/2008 | Surnilla | ................ | F02P 5/1522 123/406.45 |
| 2010/0242581 A1 * | 9/2010 | Morikawa | ............. | F02D 41/401 73/114.49 |
| 2011/0224888 A1 | 9/2011 | Girotto et al. | ................ | 701/103 |
| 2012/0204830 A1 | 8/2012 | Gottschalk et al. | .......... | 123/294 |
| 2012/0255531 A1 | 10/2012 | Kinose | .......................... | 123/673 |
| 2012/0297866 A1 | 11/2012 | Tanaka et al. | ............. | 73/114.31 |
| 2015/0051813 A1 * | 2/2015 | Ramundo | ........... | F02D 41/3005 701/104 |
| 2015/0053184 A1 * | 2/2015 | Ruth | .................. | F02M 63/0225 123/478 |
| 2016/0333809 A1 * | 11/2016 | Jammoussi | ......... | F02D 41/1497 |
| 2017/0314498 A1 * | 11/2017 | Pathan | ................ | F02D 41/0235 |

FOREIGN PATENT DOCUMENTS

| | | |
|---|---|---|
| DE | 10 2007 024 416 A1 | 11/2008 |
| DE | 10 2007 044 614 B3 | 4/2009 |
| DE | 10 2011 011 337 B3 | 2/2012 |
| DE | 11 2006 003 029 B4 | 2/2015 |
| DE | 10 2013 222 547 A1 | 5/2015 |
| DE | 10 2013 224 706 A1 | 6/2015 |
| JP | 2008138681 A | 6/2008 ............ F02D 45/00 |
| WO | 2018/068995 A1 | 4/2018 |

OTHER PUBLICATIONS

International Search Report and Written Opinion, Application No. PCT/EP2017/073498, 24 pages, dated Jan. 2, 2018.
Korean Office Action, Application No. 20197013239, 5 pages, dated Mar. 30, 2020.

* cited by examiner

METHOD AND DEVICE FOR OPERATING AN INTERNAL COMBUSTION ENGINE

CROSS-REFERENCE TO RELATED APPLICATIONS

This application is a U.S. National Stage Application of International Application No. PCT/EP2017/073498 filed Sep. 18, 2017, which designates the United States of America, and claims priority to DE Application No. 10 2016 219 575.1 filed Oct. 10 18, 2016, the contents of which are hereby incorporated by reference in their entirety.

TECHNICAL FIELD

The present disclosure relates to internal combustion engines. Various embodiments include methods and/or devices for operating an internal combustion engine.

BACKGROUND

In motor vehicles having a so-called common rail injection system (also referred to as accumulator injection system), a plurality of, typically all, injectors are coupled to a common fuel distributor (common rail) which is under a high pressure. The amount of fuel to be injected into the cylinders of the internal combustion engine in each case within a cylinder cycle, also referred to as operating cycle, is typically primarily metered by virtue of the fact that the respective injector is actuated with an actuating period, which is selected to be shorter or longer, in order to inject fuel into the respective cylinder. The injector is in each case opened during the actuating period.

By virtue of manufacturing tolerances and aging phenomena in the injection system, the injection masses can vary between the individual cylinders. This can lead to torque differences between the cylinders, which can have a negative effect on the running smoothness or the emission behavior of the internal combustion engine. Thus, particularly wear phenomena or deposits can lead to a situation in which an actual opening period or an actual degree of opening of the injector for a given fuel pressure and a given actuating period is changed during a service life of the injectors.

SUMMARY

The teachings of the present disclosure describe methods and/or corresponding devices for operating an internal combustion engine that allows reliable operation of the internal combustion engine, typically, an internal combustion engine having at least two cylinders. For example, some embodiments include a method for operating an internal combustion engine (106) having at least two cylinders (102, 103, 104, 105) for a motor vehicle, comprising: determining a respective torque output of the cylinders (102, 103, 104, 105), which occurs in each case due to an injection of fuel into the respective cylinder (102, 103, 104, 105), determining a difference in the torque outputs, comparing the difference in the torque outputs with a predetermined threshold value for the torque output, determining a respective injection mass of the respective injection into the respective cylinder (102, 103, 104, 105), determining a difference in the injection masses, comparing the difference in the injection masses with a predetermined threshold value for the injection mass, and if the determined differences in each case exceed the associated threshold value, determining whether the respective torque outputs correspond to the associated injection mass, and, if the respective torque outputs lie outside a predetermined tolerance range for a respective corresponding injection mass, and changing an injection time (T) at least in one of the cylinders (102, 103, 104, 105).

In some embodiments, if the respective torque outputs lie within the predetermined tolerance range for a respective corresponding injection mass, changing the injection mass to be injected for at least one of the cylinders (102, 103, 104, 105) in dependence on the determined difference in the torque outputs, determining a further torque output of the at least one of the cylinders (102, 103, 104, 105), which occurs due to the injection of the changed injection mass, determining whether the further torque output corresponds to the changed injection mass, and, if the further torque output lies outside a predetermined tolerance range for the changed injection mass, setting the injection mass to be injected to the original value, and changing the injection time (T) at least in the one of the cylinders (102, 103, 104, 105).

In some embodiments, the method further comprises: determining a respective crankshaft acceleration of a crankshaft (107) of the internal combustion engine (106), wherein the crankshaft acceleration occurs in each case due to the injection of fuel into the respective cylinder (102, 103, 104, 105), determining the respective torque output in dependence on the respective crankshaft acceleration.

In some embodiments, the crankshaft acceleration is determined by means of a transmitter wheel sensor and of a transmitter wheel which is coupled to the crankshaft (107).

In some embodiments, the crankshaft acceleration is determined in dependence on a running smoothness of the internal combustion engine (106).

In some embodiments, the crankshaft acceleration is determined in dependence on a change in rotational speed of the crankshaft (107).

In some embodiments, the injection masses are in each case determined in dependence on an associated pressure drop (401) in a fuel distributor (101) from which the fuel is injected into the respective cylinders (102, 103, 104, 105).

In some embodiments, the method further comprises repeating the method steps until a further determined difference in the torque outputs is less than the predetermined threshold value for the torque output.

In some embodiments, the method further comprises determining another defect if, after a predetermined time interval, the further determined difference is not less than the predetermined threshold value for the torque output.

As another example, some embodiments include a device which is designed to carry out a method as described above.

BRIEF DESCRIPTION OF THE DRAWINGS

Further advantages, features, and developments can be gathered from the following examples which are explained in conjunction with the figures, in which.

DETAILED DESCRIPTION

Figure 1:
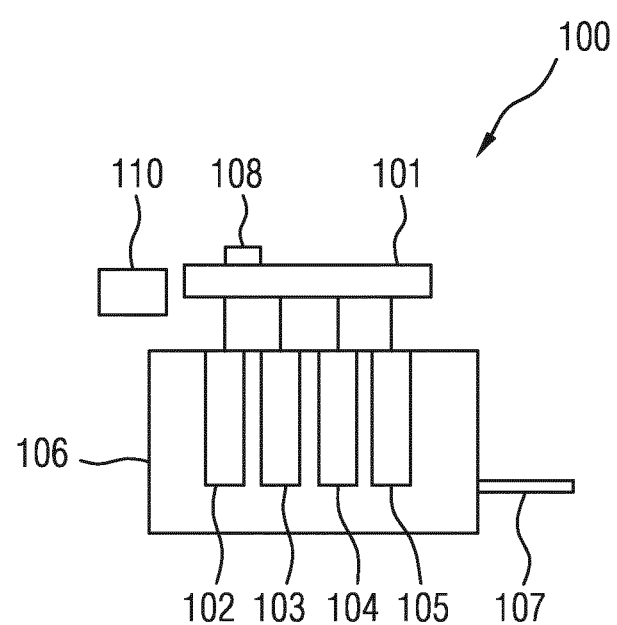
FIG. 1 shows a schematic illustration of a system having an internal combustion engine incorporating teachings of the present disclosure.

In some embodiments, a respective torque output of the cylinders is determined. The torque output occurs due to an injection of fuel into the respective cylinder. A difference in the torque outputs is determined. The determined difference in the torque outputs is compared with a predetermined threshold value for the torque outputs. A respective injection mass of the respective injection into the respective cylinder is determined. A difference in the injection masses is determined. The difference in the injection masses is compared with a predetermined threshold value for the injection mass. If the determined differences in each case exceed the associated threshold value, that is to say if the difference in the torque outputs is greater than the predetermined threshold value for the torque output, and the difference in the injection masses is greater than the predetermined threshold value for the injection mass, it is determined whether the respective torque outputs correspond to the associated injection mass. If the respective torque outputs lie outside a predetermined tolerance range for a respective corresponding injection mass, an injection time at least in one of the cylinders is changed.

The injection mass, that is to say the mass of fuel which is in each case injected into the cylinder in order to generate a torque on a crankshaft of the internal combustion engine, is normally in a linear relationship with the torque resulting from the injection mass. The injected amount of fuel therefore normally predetermines the power output of the respective cylinder. The injected amount is thus conventionally proportional to the torque of the crankshaft.

In some embodiments, a conclusion may be drawn as to whether different torque outputs of the cylinders occur due to different injection masses, or whether an injection time of the injection is a cause for the different torque outputs. Determining the injection masses which lead to the output torque of the respective cylinder makes possible a plausibility check between deviations in the injection masses, the injection times and defects in the combustion. If the difference in the injection masses does not correspond to the assigned difference in the torque outputs, it is determined that, alternatively or in addition to differences in the injection, the injection time should be changed at least in one of the cylinders in order to obtain the torque outputs of the cylinders within the predetermined tolerances.

In the case of diesel internal combustion engines, the fuel is injected into the hot, compressed air in the cylinder. The combustion is then initiated by the self-ignition resulting from the cylinder temperature which increases due to the compression. The time between beginning of injection and the beginning of the combustion is termed ignition delay. The chemical ignition delay time greatly depends on the vaporization of the mixture and thus on pressure and temperature. The change in rotational speed then in turn depends on the cylinder pressure and the mass forces.

The highest compression temperature is established shortly before the top dead center. If a combustion is initiated too early by a too early injection, the combustion pressure rises sharply and counteracts the piston movement in the cylinder. The amount of heat released in the process impairs the efficiency of the engine. Consequently, a time-advanced beginning of combustion causes an increased temperature in the cylinder.

A too late injection time can, under low load, lead to an incomplete combustion. This means that the values for hydrocarbons and carbon monoxide in the emission increase since the temperatures in the combustion chamber already begin to fall again. The combustion chamber temperature can be determined, for example, by means of an exhaust gas temperature sensor.

In some embodiments, the injection mass is determined in dependence on an associated pressure drop in a fuel distributor (also termed common rail). The fuel is injected from the fuel distributor into the respective cylinders. The fuel pressure drop which occurs when injecting fuel into the cylinder is a measure of the amount of fuel which has been injected into the cylinder during the injection. Determining the drop in fuel pressure due to an injection makes it possible to draw a conclusion on the injection mass.

The injection mass is normally linearly related to the output torque. For a relatively high injection mass, a relatively high torque is normally output. For a relatively low injection mass, a correspondingly relatively low torque is normally output. Thus, it can be assumed that the difference in the determined injection masses corresponds to the difference in the torque outputs if the different torque outputs occur due to changes in the injection mass. If, however, the difference in the injection masses does not correspond to the difference in the torque outputs, according to the application an injection time of the injection of fuel is corrected in order to match the torque outputs of the cylinders to one another.

In some embodiments, the injection mass to be injected for at least one of the cylinders changes in dependence on the determined difference in the torque outputs if the respective torque outputs lie within the predetermined tolerance range for a respective corresponding injection mass. A further torque output of the at least one of the cylinders that occurs due to the injection of the changed injection mass is determined. It is subsequently determined whether the further torque output corresponds to the changed injection mass. If the further torque output lies outside a predetermined tolerance range for the changed injection mass, the injection mass to be injected is set to the original value. The injection time is changed at least in the one of the cylinders.

In the case of a normally operating internal combustion engine, an increase in the fuel mass for the torque-relevant component of the injection leads to an increase in the output torque of this cylinder. However, in the case of an incorrect injection time, it is possible that this effect is not achieved and, for example, an increased injection mass does not lead to an expected increase in the torque. In the method according to the application, if the expected linear relationship between injection mass and torque is not established after a change in the injection mass, the injection time is changed in order to match the torque output of the cylinders to one another.

In some embodiments, a conclusion may be drawn as to whether different torque outputs of the cylinders occur due to different injection masses, or whether an injection time of the injection is a cause for the different torque output. The injection time in each case relates to a cylinder cycle of the respective cylinders, also termed operating cycle. For example, the time period of the cylinder cycle begins at the top dead center prior to intake and ends at the top dead center after the ejection of the combustion gases.

By virtue of the additional adaptation of the injection time, it is possible to avoid defective trimming of the cylinder equalization. It can be established whether a deviating torque output in fact occurs due to different injection masses or due to an incorrect injection time. Thus, inaccurate error diagnoses can also be alleviated.

In some embodiments, the respective crankshaft acceleration, for example, is determined by means of a transmitter wheel sensor and of a transmitter wheel which is coupled to the crankshaft. The transmitter wheel is, for example, a toothed wheel, and the transmitter wheel sensor is, for example, a Hall sensor. It is thus possible to evaluate tooth times in order to determine the crankshaft acceleration. In some embodiments, the crankshaft acceleration is determined in dependence on a running smoothness of the internal combustion engine. In some embodiments, the crankshaft acceleration is determined in dependence on a change in rotational speed of the crankshaft.

In some embodiments, the method steps described are at least partially repeated until a further determined difference in the torque outputs is less than the predetermined threshold value for the torque output.

In some embodiments, another defect is determined if, after a predetermined time interval, the further determined difference is not less than the predetermined threshold value for the torque output. If the method, even after being repeatedly carried out after the predetermined time interval, does not result in the torque outputs being matched, another defect is present as a cause for torque deviation, this defect not occurring due to the injection mass or the injection time. For example, the method is carried out five times or ten times until another defect is determined. The other defect is, for example, a defect in the exhaust gas recirculation or a defect in the compression.

FIG. 1 shows a system 100 having an internal combustion engine 106 and a fuel distributor 101 (also termed common rail). Fuel from a fuel tank (not shown) is collected under high pressure in the fuel distributor 101 and subsequently injected directly into cylinders 102, 103, 104 and 105 of the internal combustion engine 106. The combustion of the injected fuel leads to a torque output of the cylinders 102 to 105 to a crankshaft 107 of the internal combustion engine 106. In the illustrated exemplary embodiment, the internal combustion engine 106 has four cylinders 102 to 105. In some embodiments, the internal combustion engine has more than four or fewer than four cylinders. The cylinders 102 to 105 can also be referred to as combustion chambers of the internal combustion engine 106.

On account of manufacturing tolerances in the system 100 and through the occurrence of aging phenomena, the actually injected fuel masses can vary between the individual cylinders 102 to 105. For example, the amount of fuel which is actually injected per injector with the actuating period remaining the same varies. These differences between the injection masses of the respective cylinders 102 to 105 lead to different torque outputs of the cylinders 102 to 105 to the crankshaft 107. These torque differences can have a negative effect on the running smoothness or the emission behavior of the internal combustion engine. In some embodiments, a pressure sensor 108 is arranged on the fuel distributor 101 in order to determine the pressure within the fuel distributor 101.

A device 110, which is, for example, part of an engine controller, is configured to carry out a method explained below in conjunction with FIG. 2 in order to correct the different torque outputs, with the result that the respective torque outputs of the cylinders 102 to 105 lie within a predetermined tolerance range.

Figure 2:
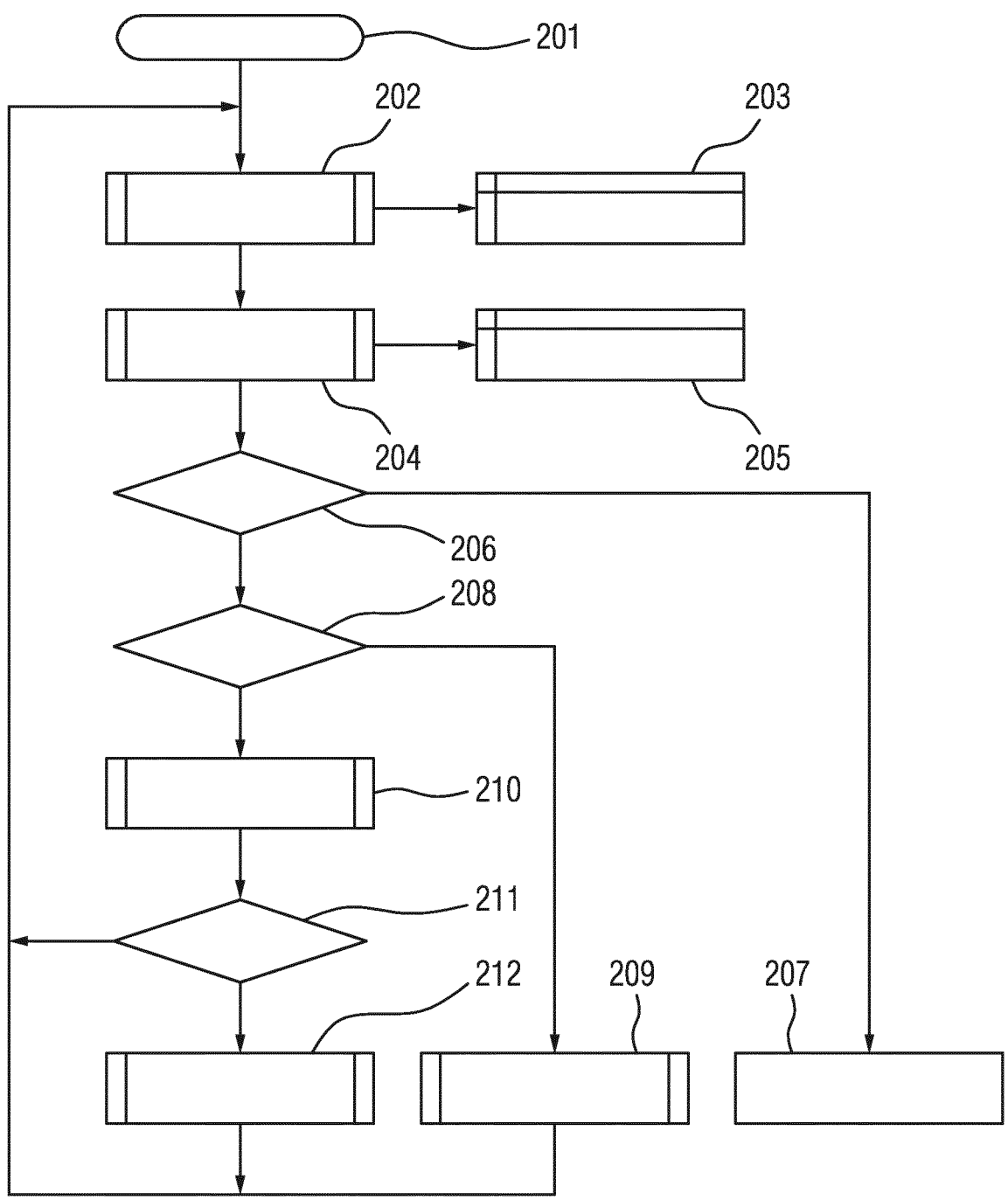
FIG. 2 shows a schematic illustration of a flow diagram of a method incorporating teachings of the present disclosure.

The method according to FIG. 2 is started in step 201. Subsequently, in step 202, the torque output of the cylinder 102 is compared with the torque output of the cylinder 103 and with the torque output of the cylinder 104 and with the torque output of the cylinder 105. For this purpose, for example, the crankshaft acceleration per cylinder cycle of the cylinders 102 to 105 is compared. In particular, a difference in the crankshaft accelerations is determined in order to draw a conclusion on the variations in the crankshaft acceleration. According to further embodiments, other combinations of the cylinders 102 to 105 are used for the comparison.

The determined torque difference is stored in step 203 for later use. In step 204, there is determined the injection mass of the injections into the cylinder 102 to 105 which have led to the torque outputs which have been determined in step 202. In particular, the injection mass is determined in dependence on a pressure drop in the fuel distributor 101.

Figure 4:
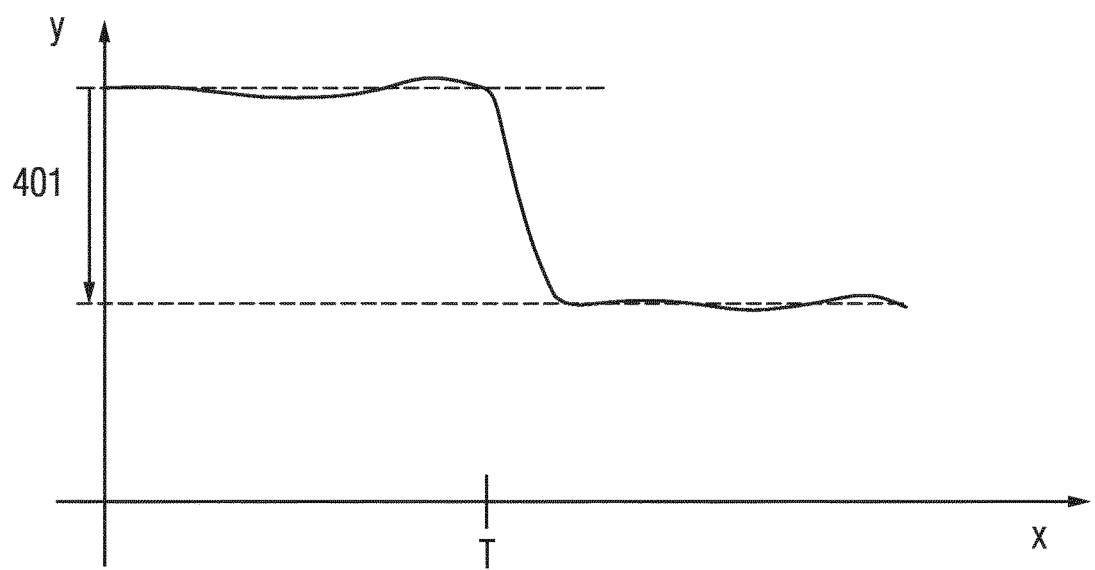
FIG. 4 shows a schematic illustration of a fuel pressure drop due to an injection incorporating teachings of the present disclosure.

As can be seen particularly from FIG. 4 in which the time is plotted on the X axis and the fuel pressure in the fuel distributor 101 is plotted on the Y axis, a fuel pressure drop 401 follows an injection at the time T. A conclusion can be drawn on the injection mass from the value of the fuel pressure drop 401. A change in the injection mass therefore also results in a change in the fuel pressure drop 401.

The determined injection mass difference or the determined pressure drop difference is stored in step 205 for later use. It is determined in step 206 whether a deviation in the respective torque outputs of the cylinders 102 to 105 is greater than a predetermined threshold value. For example, a comparison is made as to whether the difference between the torque outputs is greater than the predetermined threshold value. It is additionally determined whether a deviation in the pressure drops with respect to one another, that is to say a difference in the injection masses with respect to one another, is greater than a predetermined threshold value. For example, a comparison is made as to whether the difference between the injection masses is greater than the predetermined threshold value. If the difference in the torque outputs and the difference in the injected fuel masses are less than the respectively associated threshold values, a normally operating system is inferred and the method is at least temporarily ended in step 207 without an adjustment of the injection.

If it is determined in step 206 that the deviation in the torque outputs and/or the deviation in the pressure drops is greater than the predetermined threshold value and/or the deviation in the pressure drops is greater than the predetermined threshold value, it is determined in step 208 whether the determined pressure drops correspond to the associated determined torques. It is thus determined whether an expected torque output occurs at a certain value of the pressure drop 401.

If the determined pressure drops do not correspond to the determined injection masses, an incorrect injection position is inferred in step 209. This is correspondingly corrected in step 209.

If it is determined in step 208 that the pressure drops and the torques correspond to one another, the injection mass is adapted at least in one of the cylinders 102 to 105 in step 210. For example, the injection mass which is injected into the cylinder 102 per cylinder cycle is changed. The change in the injection mass is dependent on the determined difference between the torque outputs which has been stored in step 203.

Figure 3:
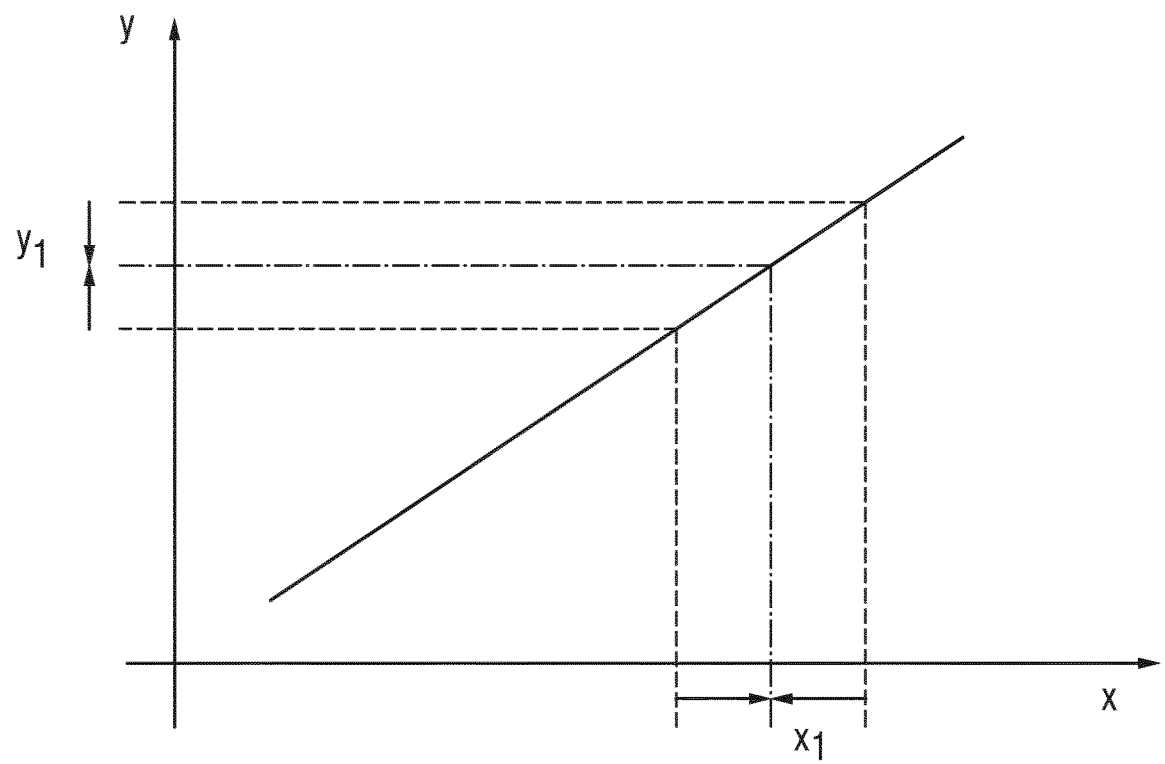
FIG. 3 shows a schematic illustration of the relationship between torque and injection mass incorporating teachings of the present disclosure.

As can be seen particularly from FIG. 3, the injection mass and the torque resulting therefrom are linearly related to one another. The injection mass is plotted on the X axis and the torque on the Y axis. If the torque of the cylinder 102 is intended to be reduced by the value Y1, the injection mass for the cylinder 102 is correspondingly reduced by the value X1. If the torque of the cylinder 102 is intended to be increased, the injection mass for the cylinder 102 is correspondingly increased.

If, however, the injection time T is incorrect, it is possible that a change in the injection mass does not lead to a corresponding changed torque. For example, an increase in the injection mass does then not lead to an increase in the torque resulting therefrom.

The injection time T is particularly the time at which the torque-relevant injection of the injection mass of the fuel occurs per cylinder cycle. The injection time T can also be referred to as injection position and/or injection phase.

Figure 5:
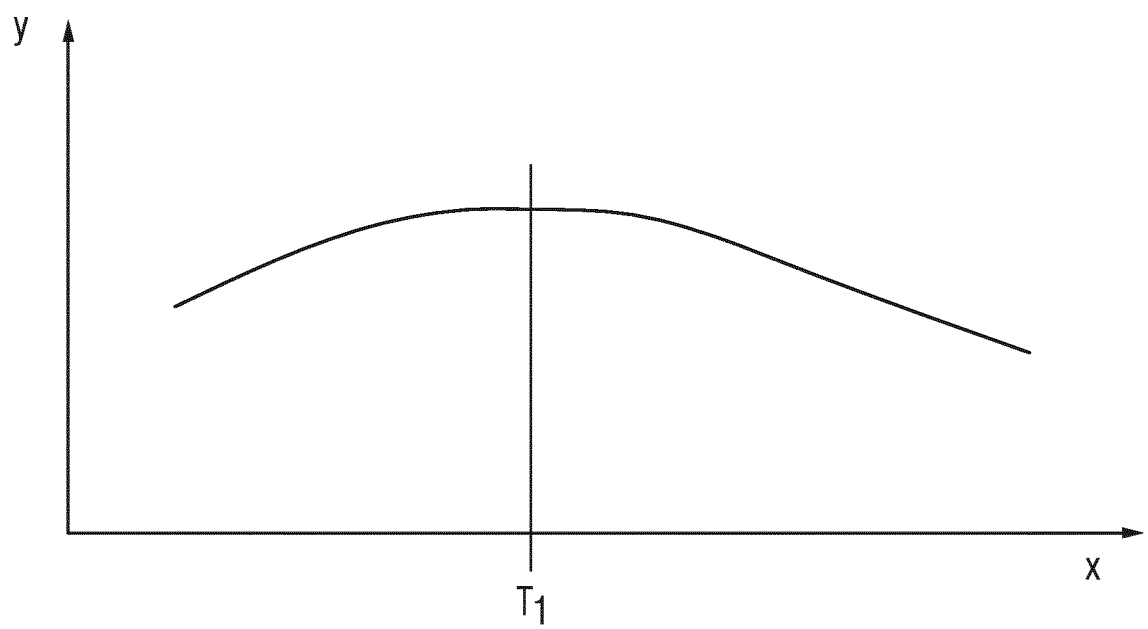
FIG. 5 shows a schematic illustration of a relationship between injection time and torque incorporating teachings of the present disclosure.

As can be seen particularly from FIG. 5 in which the injection time is plotted on the X axis and the torque is plotted on the Y axis, the output torque decreases if the injection time T deviates from the optimum injection time T1.

A correction of the injection time T occurs, for example, iteratively while taking account of the exhaust gas temperature. If, for example, a change in the injection time in the advanced direction does not lead to the desired change in the output torque upon renewed adaptation of the injection mass, but to an increase in the exhaust gas temperature, it can be concluded that the injection time before the adjustment was too advanced. All further iteration steps should then occur in the retarded direction.

Subsequently, in step 211, the change in torque is additionally checked for plausibility with the change in injection mass. A further torque output, for example of the cylinder 102, which occurs due to the injection of the changed injection mass, is determined. It is subsequently determined whether the further torque output with the changed injection mass lies within a predetermined tolerance range for the changed injection mass.

If the changed injection mass results in the expected change in the torque, the method is begun again at step 202. If the further torque output lies outside the predetermined tolerance range for the changed injection mass, the injection mass change from step 210 is reversed in step 212, since the torque deviation does not occur due to different injection masses. In addition, the injection time T of the injection is corrected in step 212.

The control process is repeated until a uniform torque is established on all cylinders 102 to 105 due to the adaptation of the injection mass and of the injection time T. In particular, the method steps 202 to 212 are repeated until, in step 206, it is determined that the differences are less than the associated predetermined threshold values.

If, after a predetermined time period, no convergence of the method occurs, that is to say if it is not established within the predetermined time period that the differences are less than the associated predetermined threshold values, another defect in the system can be inferred. The different torque outputs are then not caused by different injection masses or an incorrect injection time T. The other defect is in particular a defect in the combustion, for example a compression loss of one or more of the cylinders 102 to 105 and/or a nonuniform exhaust gas recirculation to the cylinders 102 to 105.

In the method, an estimate of the injection mass due to the pressure drop in the fuel distributor caused by the injection is thus taken into account and combined with the linear relationship between injection mass and torque output. It is thus possible to carry out a plausibility check of the injection mass with respect to the torque change. The adaptation of the injection time T makes it possible to avoid defective trimming of the cylinder equalization. Since the injection correction values are also used for assessing the injection, it is possible to avoid a faulty diagnosis by the additional cross-plausibility check with the determined fuel pressure drops. Thus, a reliable cylinder equalization in internal combustion engines with direct injection is possible. This leads to a reliable operation of the internal combustion engine 106.

LIST OF REFERENCE SIGNS

100 System
101 Fuel distributor
102, 103, 104, 105 Cylinders
106 Internal combustion engine
107 Crankshaft
108 Pressure sensor
110 Device
201-212 Method steps
401 Pressure drop
T Time
T1 Injection time
X1, Y1 Value

What is claimed is:

1. A method for operating an internal combustion engine having at least two cylinders, the method comprising:
    determining a respective torque output of each of the at least two cylinders resulting from a respective injection of fuel into the respective cylinder;
    determining a difference in the respective torque output;
    comparing the difference in the respective torque output with a predetermined threshold value for the torque output;
    determining a respective injection mass of the respective injection into the respective cylinder;
    determining a difference in the respective injection masses;
    comparing the difference in the injection masses with a predetermined threshold value for the injection mass;
    if the determined differences in each case exceed the associated threshold value, determining whether the respective torque outputs correspond to the associated injection mass; and
    if the respective torque outputs lie outside a predetermined tolerance range for a respective corresponding injection mass, changing an injection time in at least one of the at least two cylinders;
    determining a second defect if, after a predetermined time interval, the further determined difference is not less than the predetermined threshold value for the torque output, wherein the second defect comprises at least one defect selected from the group consisting of: a defect in exhaust gas recirculation and a defect in compression.

2. The method as claimed in claim 1, further comprising:
    if the respective torque outputs lie within the predetermined tolerance range for a respective corresponding injection mass, changing the injection mass to be injected for at least one of the at least two cylinders in dependence on the determined difference in the torque outputs;
    determining a further torque output of the at least one of the at least two cylinders resulting from the injection of the changed injection mass;
    determining whether the further torque output corresponds to the changed injection mass;

if the further torque output lies outside a predetermined tolerance range for the changed injection mass, setting the injection mass to be injected to the original value; and changing the injection time in at least the one of the at least two cylinders.

3. The method as claimed in claim 1, further comprising:

determining a respective crankshaft acceleration of a crankshaft resulting from the injection of fuel into the respective cylinder; and determining the respective torque output in dependence on the respective crankshaft acceleration.

4. The method as claimed in claim 3, wherein determining the crankshaft acceleration includes monitoring a transmitter wheel sensor and a transmitter wheel coupled to the crankshaft.

5. The method as claimed in claim 3, wherein determining the crankshaft acceleration includes monitoring a running smoothness of the internal combustion engine.

6. The method as claimed in claim 3, wherein determining the crankshaft acceleration includes monitoring a change in rotational speed of the crankshaft.

7. The method as claimed in claim 1, wherein determining the injection masses includes monitoring an associated pressure drop in a fuel distributor from which the fuel is injected into the respective cylinders.

8. The method as claimed in claim 1, further comprising repeating the method until a further determined difference in the torque outputs is less than the predetermined threshold value for the torque output.

9. A device comprising:

a processor; and a memory storing a set of instructions, the instructions when loaded and executed by the processor, causing the processor to:

determine a respective torque output of at least two cylinders resulting from a respective injection of fuel into the respective cylinder;

determine a difference in the respective torque output;

compare the difference in the respective torque output with a predetermined threshold value for the torque output;

determine a respective injection mass of the respective injection into the respective cylinder;

determine a difference in the respective injection masses;

compare the difference in the injection masses with a predetermined threshold value for the injection mass;

if the determined differences in each case exceed the associated threshold value, determine whether the respective torque outputs correspond to the associated injection mass;

if the respective torque outputs lie outside a predetermined tolerance range for a respective corresponding injection mass, change an injection time in at least one of the at least two cylinders; and determining a second defect if, after a predetermined time interval, the further determined difference is not less than the predetermined threshold value for the torque output, wherein the second defect comprises at least one defect selected from the group consisting of: a defect in exhaust gas recirculation and a defect in compression.

* * * * *